(12) United States Patent
Wang et al.

(10) Patent No.: US 10,102,353 B2
(45) Date of Patent: Oct. 16, 2018

(54) DIGITAL RESOURCE PROTECTION METHOD AND APPARATUS, AND DIGITAL RESOURCE USING METHOD AND APPARATUS

(71) Applicant: I-PATROL TECHNOLOGY LIMITED, Hong Kong (CN)

(72) Inventors: Yi Wang, Hong Kong (CN); Michael Kuan, Shanghai (CN)

(73) Assignee: I-PATROL TECHNOLOGY LIMITED, Hong Kong (CN)

( * ) Notice: Subject to any disclaimer, the term of this patent is extended or adjusted under 35 U.S.C. 154(b) by 160 days.

(21) Appl. No.: 14/705,219

(22) Filed: May 6, 2015

(65) Prior Publication Data
US 2015/0235012 A1    Aug. 20, 2015

Related U.S. Application Data

(63) Continuation of application No. PCT/CN2013/073039, filed on Mar. 22, 2013.

(30) Foreign Application Priority Data

Feb. 4, 2013    (CN) .......................... 2013 1 0043364

(51) Int. Cl.
*G06F 21/10* (2013.01)
*H04L 9/32* (2006.01)

(52) U.S. Cl.
CPC ............ *G06F 21/10* (2013.01); *H04L 9/3226* (2013.01); *G06F 2221/0715* (2013.01)

(58) Field of Classification Search
USPC ........ 713/192, 150, 160, 181; 726/2, 21, 36; 380/255, 264, 276
See application file for complete search history.

(56) References Cited

U.S. PATENT DOCUMENTS

| | | | | |
|---|---|---|---|---|
| 5,490,258 A | * | 2/1996 | Fenner ................ | H03M 7/4006 707/999.001 |
| 7,970,132 B2 | * | 6/2011 | Fahrny .................. | H04N 7/162 380/200 |

(Continued)

FOREIGN PATENT DOCUMENTS

| | | |
|---|---|---|
| CN | 101196970 A | 6/2008 |
| CN | 101997674 A | 3/2011 |
| CN | 102238135 A | 11/2011 |

OTHER PUBLICATIONS

International Search Report of Application No. PCT/CN2013/073039, from the State Intellectual Property Office of China, dated Nov. 7, 2013.

(Continued)

*Primary Examiner* — Sharif E Ullah
(74) *Attorney, Agent, or Firm* — Finnegan, Henderson, Farabow, Garrett & Dunner LLP (57) ABSTRACT

A digital resource protection apparatus, includes: a configuring module to configure N encryption index values for a digital resource to be encrypted, wherein N is an integer greater than 0; and a digital logic control module configured to perform a logic encryption of the digital resource through a preset digital logic circuit, by using one or more of the N encryption index values and the digital resource as input parameters of the preset digital logic circuit.

14 Claims, 6 Drawing Sheets

(56) References Cited

U.S. PATENT DOCUMENTS

| | | | |
|---|---|---|---|
| 2004/0052367 A1* | 3/2004 | Yang | H04L 9/065 380/28 |
| 2004/0202320 A1* | 10/2004 | Amini | H04L 29/06027 380/36 |
| 2007/0028022 A1* | 2/2007 | Stephani | G06F 7/74 710/116 |
| 2009/0067625 A1* | 3/2009 | Patel | H04L 9/0656 380/201 |
| 2010/0014122 A1* | 1/2010 | Massicot | H04N 1/32154 358/3.28 |
| 2013/0254636 A1* | 9/2013 | Kirkpatrick | H04L 9/0866 714/784 |
| 2014/0007222 A1* | 1/2014 | Qureshi | G06F 21/10 726/16 |
| 2014/0058888 A1* | 2/2014 | Bingham | G06Q 10/10 705/26.8 |
| 2015/0154383 A1* | 6/2015 | Huang | G06F 21/10 726/30 |

OTHER PUBLICATIONS

Written Opinion of the International Searching Authority for Application No. PCT/CN2013/073039, from the State Intellectual Property Office of China, dated Nov. 7, 2013.

\* cited by examiner

DIGITAL RESOURCE PROTECTION METHOD AND APPARATUS, AND DIGITAL RESOURCE USING METHOD AND APPARATUS

CROSS-REFERENCE TO RELATED APPLICATIONS

This application is a continuation of International Application No. PCT/CN2013/073039, filed Mar. 22, 2013, which claims priority from Chinese Patent Application No. 201310043364.3, filed Feb. 4, 2013, the entire contents of all of which are incorporated herein by reference.

TECHNICAL FIELD

This disclosure generally relates to the digital resource field and, more particularly, to a digital resource protection method and apparatus, and a digital resource using method and apparatus.

BACKGROUND

Digital resources include content products and services that are generated, produced, managed, transmitted, operated and consumed using digital technology such as digital media, computer software, e-service, and protection provisions for apparatus using rights.

Conventionally, digital resources are protected and authorized by a digital rights management (DRM) technology. Based on the DRM technology, a digital resource authorization center is first established, and encoded compressed digital resources can be encrypted for protection with application of a secret key. A header of the encrypted digital resources stores an identification of the secret key and a universal resource locator (URL) of the digital resource authorization center. When a user requests the digital resources, the digital resource center performs authorization through the identification of the secret key and the URL information stored in the header. After authorization, the user can decrypt and play the digital resources with the secret key issued by the digital resource authorization center.

When the secret key is obtained by an unauthorized user during the delivery, the unauthorized user can decrypt the digital resources for unauthorized use.

SUMMARY

According to a first aspect of the present disclosure, there is provided a digital resource protection apparatus, comprising: a configuring module to configure N encryption index values for a digital resource to be encrypted, wherein N is an integer greater than 0; and a digital logic control module configured to perform a logic encryption of the digital resource through a preset digital logic circuit, by using one or more of the N encryption index values and the digital resource as input parameters of the preset digital logic circuit.

According to a second aspect of the present disclosure, there is provided a digital resource using apparatus, comprising: a receiving module configured to receive authorization information of a user, the authorization information being generated by a digital resource protection apparatus by binding user feature information of the user with an encryption index value of N encryption index values, wherein N is an integer greater than 0; a feature obtaining module configured to obtain user feature information of the user; a first decrypting module configured to obtain the encryption index value that is bound with the user by decrypting the received authorization information according to the user feature information obtained by the feature obtaining module; and a second decrypting module including a preset digital logic circuit, and configured to decrypt an encrypted digital resource by inputting the encryption index value obtained by the first decrypting module and the encrypted digital resource to the preset digital logic circuit to perform a logical decryption, to obtain the decrypted digital resource.

According to a third aspect of the present disclosure, there is provided a digital resource protection method, comprising: configuring N encryption index values for a digital resource to be encrypted, wherein N is an integer greater than 0; and performing a logic encryption of the digital resource through a preset digital logic circuit, by using one or more of the N encryption index values and the digital resource as input parameters of the preset digital logic circuit.

According to a fourth aspect of the present disclosure, there is provided a digital resource using method, comprising: receiving authorization information of a user, the authorization information being generated by a digital resource protection apparatus by binding user feature information of the user with an encryption index value of N encryption index values, wherein N is an integer greater than 0; obtaining feature information of the user; obtaining the encryption index value that is bound with the user by decrypting the received authorization information according to obtained user feature information; and decrypting an encrypted digital resource by inputting the obtained encryption index value and the encrypted digital resource to a preset digital logic circuit to perform a logical decryption, to obtain the decrypted digital resource.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
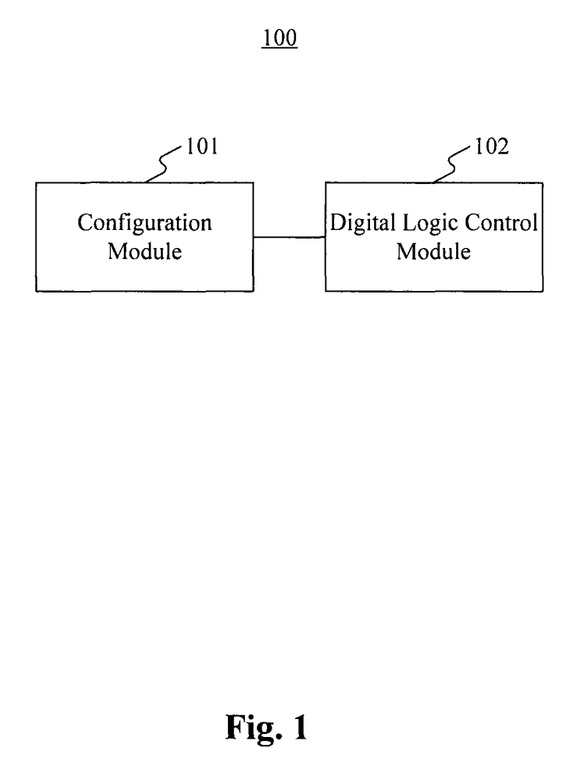
FIG. 1 is a block diagram of a digital resource protection apparatus, according to an exemplary embodiment.

FIG. 1 is a block diagram of a digital resource protection apparatus 100, according to an exemplary embodiment. Referring to FIG. 1, the apparatus 100 includes a configuration module 101 and a digital logic control module 102 that further includes a preset digital logic circuit (not shown).

In exemplary embodiments, the configuration module 101 configures a plurality of encryption index values, such as N (N>0) encryption index values, for a digital resource to be encrypted. The digital logic control module 102 is configured to perform a logic encryption of the digital resource through the digital logic circuit, by using one or more of the N encryption index values and the digital resource as input parameters of the digital logic circuit.

In one exemplary embodiment, the configuration module 101 can determine a value of N according to a circulation amount of the digital resource, e.g., a number of authorized copies of the digital resource. N can be equal to, or larger than, the circulation amount of the digital resource.

In one exemplary embodiment, the digital logic control module 102 performs the logic encryption of the digital resource by using a random one of the N encryption index values and the digital resource as input parameters of the digital logic circuit, to obtain encrypted data. The obtained encrypted data may vary according to the inputted encryption index value.

In one exemplary embodiment, the digital logic control module 102 performs the logic encryption of the digital resource by using a set of encryption index values and the digital resource as input parameters of the digital logic circuit, to obtain encrypted data. The obtained encrypted data is the same for each encryption index value in the set. An advantage of using the set of encryption index values is that, during distribution of the digital resource, there is one piece of encrypted data on which different users can have the same authority, which facilitates control of the digital resource and improvement of efficiency. For example, the set includes M encryption index values of the N encryption index values configured by the configuration module 101, where 1<M<=N.

In exemplary embodiments, the digital resource can be digital media, such as text, image, audio, video, or any combination thereof, computer software, e-service, and protection provisions of apparatus using rights, etc.

In the above embodiments, different digital logic circuits generate different encrypted data, even when the same encryption index values are used. Therefore, even if an unauthorized user obtains the encryption index values for encrypting the digital resource, the unauthorized user still cannot decrypt the digital resource due to lack of the digital logical circuit that applies the encryption to the digital resource, which improves security for the digital resource protection.

In exemplary embodiments, the apparatus 100 can further provide an authorization mechanism for encrypted digital resource for use in issuing of the digital resource. For example, the N encryption index values can be bound with N users, respectively. The digital logic control module 102 can use a subset G of the N encryption index values and the digital resource as input parameters of the digital logic circuit, to perform the logic encryption of the digital resource. The encrypted digital resource can be decrypted only by the users bound with the encryption index values in the subset G. Other users cannot decrypt the encrypted digital resource.

In exemplary embodiments, when a user obtains access to the digital resource legally, user feature information of the user can correspond to an encryption index value that is used to encrypt the digital resource and set use authority. Accordingly, only this user can use his/her own feature information to decrypt the encrypted digital resource. The encryption is on a hardware logic level, which can improve protection and security of the digital resource.

Figure 2:
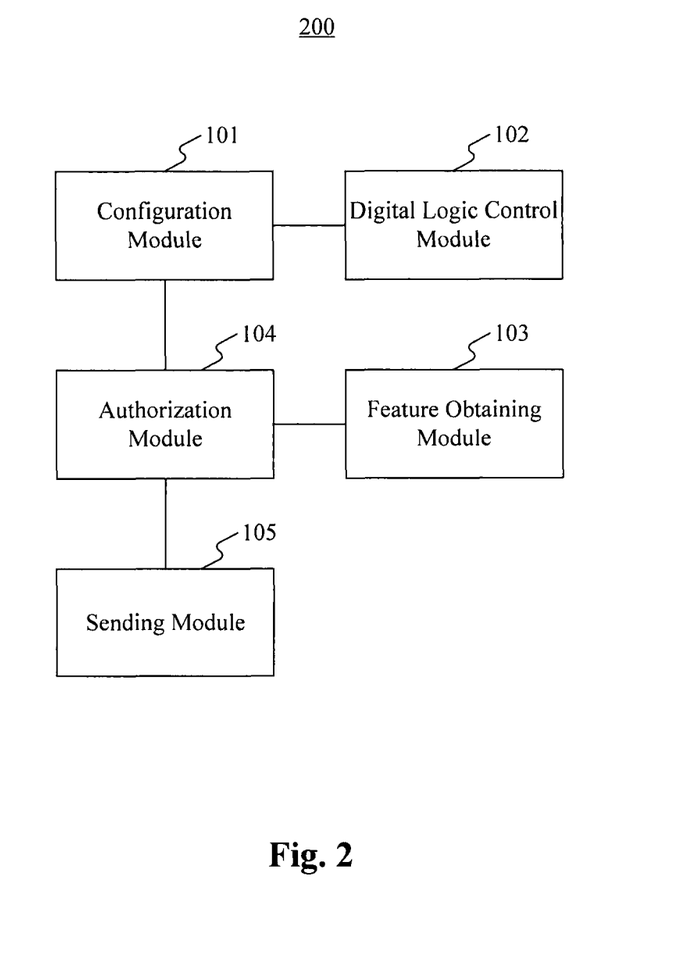
FIG. 2 is a block diagram of a digital resource protection apparatus, according to an exemplary embodiment.

FIG. 2 is a block diagram of a digital resource protection apparatus 200, according to an exemplary embodiment. Referring to FIG. 2, the apparatus 200 includes a feature obtaining module 103, an authorization module 104, and a sending module 105, in addition to the configuration module 101 and the digital logic control module 102.

In exemplary embodiments, the feature obtaining module 103 is configured to obtain user feature information of a registered user who has the authority to use the digital resource. The user feature information comprises a terminal identification, designated gesture or touch movement information, user biological information, characters input by the user, or any combination thereof. The terminal identification is used to identify a terminal used by the user to access the digital resource. The terminal may have a touch sensing function to receive the user's input through a designated gesture or touch movement on the terminal. In this way, the feature obtaining module 103 can obtain designated gesture or touch movement information. The terminal may also be configured to obtain biological features of the user, such as a face feature, a pupil feature, a fingerprint feature, etc.

In exemplary embodiments, the authorization module 104 is configured to bind the user feature information obtained by the feature obtaining module 103 with one of the N encryption index values to generate authorization information of the registered user. The authorization information comprises a binding relationship between the user feature information of the registered user and the one of the N encryption index values.

In one exemplary embodiment, one encryption index value is allocated to one registered user, and the authorization module 104 selects one unallocated encryption index value from the N encryption index values, to bind the one encryption index value with the user feature information of the registered user and generate the authorization information. In another embodiment, the authorization information of the registered user is a value generated by performing an exclusive-or (XOR) operation on the user feature information and the encryption index value, i.e., $F \oplus Aindex1$, where F represents the user feature information, and Aindex1 represents the encryption index value. In some embodiments, the authorization module 104 can bind the encryption index value with the user feature information in other ways, and one encryption index value can be allocated to multiple registered users.

In exemplary embodiments, the sending module 105 is configured to send the authorization information to the terminal of the registered user. The terminal can obtain the encryption index value based on user feature information and the authorization information of the registered user. The terminal can then decrypt the encrypted digital resource with the encryption index value and a digital logical circuit matching the digital logical circuit of the digital logic control module 102.

In the above illustrated embodiment, when the terminal receives the authorization information sent from the sending module 105, the registered user will need to input the user feature information that matches the registered user feature information, for the terminal to obtain the encryption index value of the registered user according to the inputted user feature information. The terminal can then use the obtained encryption index value to decrypt the encrypted digital resource using the digital logic circuit matching that of the digital logic control module 102.

In the above illustrated embodiment, the authorization information is the value after performing the XOR operation on the user feature information F and the encryption index value Aindex1, i.e., F $\oplus$ Aindex1. Assuming F=0111001, and Aindex1=1010001, the authorization value U=F $\oplus$ Aindex1=1101000. If the user feature information input at the terminal is also F, the XOR operation on the input user feature information F and the authorization value U1 will generate Aindex1, i.e., F $\oplus$U=1010001=Aindex1. In exemplary embodiments, the user feature information inputted at the terminal may not be exactly the same as the registered user feature information. For example, user designated gestures and user biological information may change as a result of a change in sensing locations. For example, the user feature information input at the terminal may be F'. Therefore, in the embodiments, a fault tolerance and rectification mechanism is provided by setting an error correction code (ECC), such that the user feature information input at the terminal within an applicable range is regarded as the same as the registered user feature information. For example, if the ECC is set, ECC $\oplus$ F can generate EF, i.e., EF=ECC $\oplus$ F. If the user feature information F' input at the terminal falls into the applicable range, the terminal can recover ECC from F' $\oplus$ EF and further recover F from ECC $\oplus$ EF. Alternatively, if the user feature information F' falls beyond the applicable range, the terminal cannot recover ECC from F' $\oplus$ EF and, hence, cannot recover F. Also for example, the feature obtaining module 103 can determine if a value of a piece of the obtained user feature information is within a predetermined range, and considers the value as being the same if within the predetermined range.

In exemplary embodiments, a subdivision control mechanism is provided. In one exemplary embodiment, the configuration module 101 configures a first one of the N encryption index values with a first response vector value corresponding to the first encryption index value. The first response vector value is used to control a number of times the digital resource is used by the registered user bound with the first encryption index value. The first response vector value varies according to the number of times the digital resource is used by the registered user. When the number of times reaches a preset threshold, the first response vector value will cause the first encryption index value to expire or cause the binding of the first encryption index value and the user feature information of the registered user to expire. For example, assuming that when the first response vector value is 0, the first encryption index value will expire or the binding of the first encryption index value and the user feature information of the registered user will expire, and that the apparatus 200 will allow the registered user to use the digital resource for 50 times, the first response vector value can be set to be 50 initially. Each time the registered user uses the digital resource once, the first response vector value will be decreased by one.

In one exemplary embodiment, the configuration module 101 configures a second one of the N encryption index values with a second response vector value corresponding to the second encryption index value. The second response vector value is used to limit a use period of the digital resource by the user that is bound with the second encryption index value. The second response vector value can vary according to a change in time, and can maintain the same value when the current time is in the use period. The second response vector value may cause the second encryption index value to expire or cause the binding of the second vector value and the user feature information to expire, when the current time is not in the use period. For example, assuming that the first response vector value is 0, the first encryption index value expires or the binding of the first encryption index value and the user feature information of the registered user expires, then if the apparatus 100 will only allow the user to use the digital resource within the time period of T, the second response vector value can be set to be T. When the current time is within a time period of T, the second response vector value is not 0 and the second encryption index value works. Alternatively, when the current time is beyond the time period of T, the second response vector value can be set to be 0 and the second encryption index value expires.

In one exemplary embodiment, the configuration module 101 configures a third one of the N encryption index values with a third response vector value corresponding to the third encryption index value. The third response vector value is used to limit the terminal used by the user that is bound with the third encryption index value to access the digital resource, such as limiting a type of the terminal or a specific terminal.

In one exemplary embodiment, the configuration module 101 configures a fourth one of the N encryption index values with a fourth response vector value corresponding to the fourth encryption index value. The fourth response vector value is used to limit a physical position for the use of the digital resource by the user that is bound with the fourth encryption index value.

The configuration module 101 can also configure other response vector values for the use of the digital resource. It is not limited by the present disclosure.

In exemplary embodiments, considering circulation of the digital resource, users of the digital resource may change. For example, a registered user may transfer the digital resource to another user, or when the use period expires, the registered user loses the use right. Accordingly, the apparatus 100 may also include a cancellation module (not shown) configured to cancel the registered user's use right to the digital resource. For example, to cancel the registered user's use right, the cancellation module can cause the encryption index value that is bound with the registered user to expire, or relieve the binding between user feature information of the registered user and the encryption index value.

For example, assuming that a first registered user F1 has the use right of the digital resource and a second user F2 does not, if F1 transfers the digital resource to F2, the cancellation module will relieve the binding between user feature information of F1 and the encryption index value that is bound with F1. The feature obtaining module 103 will obtain user feature information of F2, and the authorization module 104 will bind the encryption index value and the obtained user feature information of F2 so as to generate authorization information of F2. The sending module 105 will send the authorization information of F2 to F2, thereby completing authorization exchange between F1 and F2. Thereafter, F1 will no longer have the right to use the digital resource, and F2 obtains the right to use the digital resource.

Figure 3:
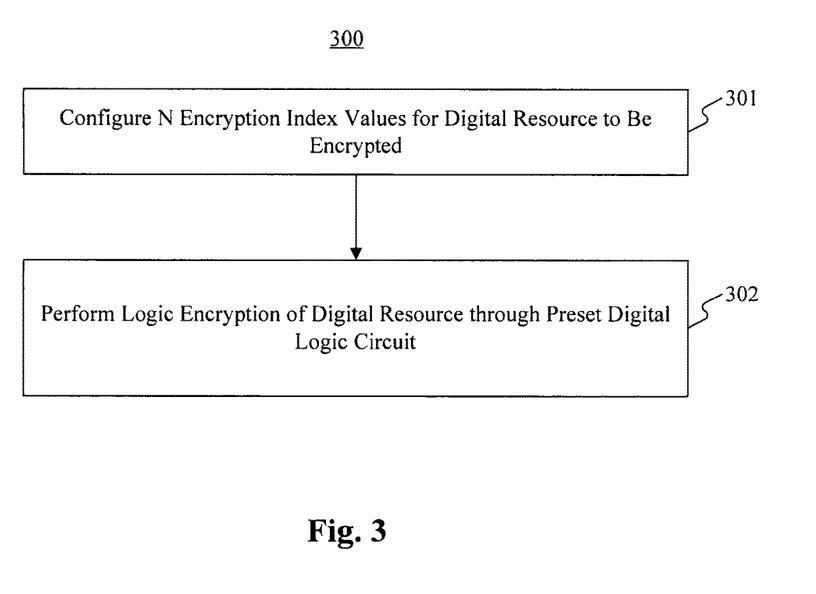
FIG. 3 is a flowchart of a digital resource protection method, according to an exemplary embodiment.

FIG. 3 is a flowchart of a digital resource protection method 300 for use in a device, according to an exemplary embodiment. Referring to FIG. 3, the method 300 includes the following steps.

In step 301, the device configures a plurality of encryption index values, such as N (N>0) encryption index values, for a digital resource to be encrypted. For example, a value of N is determined by a circulation amount of the digital resource, e.g., a number of authorized copies of the digital resource. N can be equal to, or larger than, the circulation amount of the digital resource.

In step 302, the device perform a logic encryption of the digital resource through a preset digital logic circuit, by using one or more of the N encryption index values and the digital resource as input parameters of the digital logic circuit.

In one exemplary embodiment, the logic encryption of the digital resource is performed by using a random one of the N encryption index values and the digital resource as input parameters of the digital logic circuit, to obtain encrypted data. The obtained encrypted data may vary according to the inputted encryption index value.

In one exemplary embodiment, the digital logic circuit uses a set of encryption index values and the digital resource as the input parameters, to obtain encrypted data. The obtained encrypted data is the same for each encryption index value in the set. An advantage of using the set of encryption index values is that, during distribution of the digital resource, there is one piece of encrypted data on which different users can have the same authority, which will facilitate the control of the digital resource and improvement of efficiency. For example, the set includes M encryption index values of the N encryption index values, where 1<M<=N.

In exemplary embodiments, the digital resource can be digital media, such as text, image, audio, video, or any combination thereof, computer software, e-service, and protection provisions of apparatus using rights, etc.

In the above embodiments, different digital logic circuits generate different encrypted data, even when the same encryption index values are used. Therefore, even if an unauthorized user obtains the encryption index values for encrypting the digital resource, the unauthorized user still cannot decrypt the digital resource due to lack of the digital logical circuit that applies the encryption to the digital resource, which improves security for the digital resource protection.

In exemplary embodiments, an authorization mechanism for encrypted digital resource is provided for use in issuing of the digital resource. For example, the N encryption index values can be bound with N users, respectively. The digital logic control circuit can use a subset G of the N encryption index values and the digital resource as input parameters, to perform the logic encryption of the digital resource. The encrypted digital resource can be decrypted only by the users bound with the encryption index values in the subset G. Other users cannot decrypt the encrypted digital resource.

In exemplary embodiments, when a user obtains access to the digital resource legally, user feature information of the user can correspond to an encryption index value that is used to encrypt the digital resource and set use authority. Accordingly, only this user can use his/her own feature information to decrypt the encrypted digital resource. The encryption is on a hardware logic level, which can improve protection and security of the digital resource.

Figure 4:
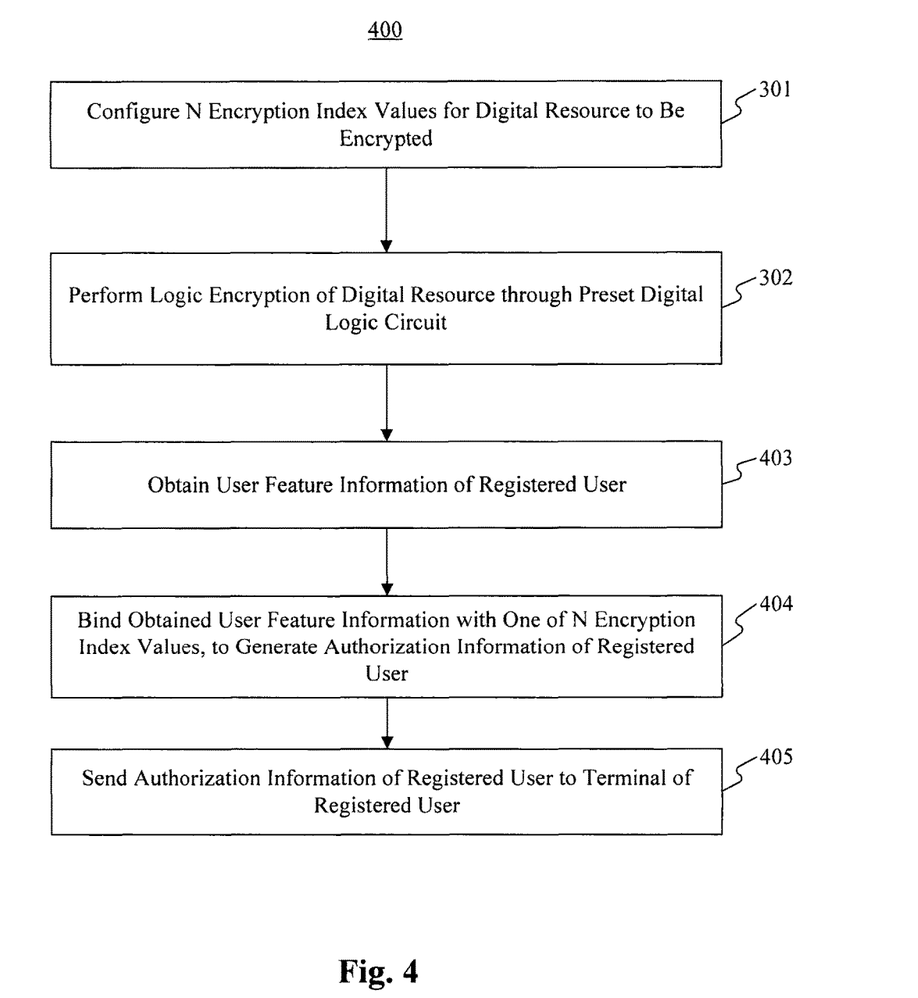
FIG. 4 is a flowchart of a digital resource protection method, according to an exemplary embodiment.

FIG. 4 is a flowchart of a digital resource protection method 400 for use in a device, according to an exemplary embodiment. Referring to FIG. 4, the method 400 includes the following steps, in addition to steps 301 and 302 in FIG. 3.

In step 403, the device obtains user feature information of a registered user who has the authority to use the digital resource. The user feature information comprises a terminal identification, designated gesture or touch movement information, user biological information, characters input by the user, or any combination thereof. The terminal identification is used to identify a terminal used by the user to access the digital resource. The terminal may have a touch sensing function to receive the user's input through a designated gesture or touch movement on the terminal. In this way, the device can obtain designated gesture or touch movement information. The terminal may also obtain biological features of the user, such as a face feature, a pupil feature, a fingerprint feature, etc.

In step 404, the device binds the obtained user feature information with one of the N encryption index values to generate authorization information of the registered user.

In one exemplary embodiment, one encryption index value is allocated to one registered user, and one unallocated encryption index value is selected from the N encryption index values, to bind with the user feature information of the registered user and generate the authorization information of the registered user. In another embodiment, the authorization information of the registered user is a value generated by performing an exclusive-or (XOR) operation on the user feature information and the encryption index value, i.e., $F \oplus Aindex1$, where F represents the user feature information, and Aindex1 represents the encryption index value. In some embodiments, the device can bind the encryption index value with the user feature information in other ways, and one encryption index value can be allocated to multiple registered users.

In step 405, the device sends the authorization information of the registered user to the terminal of the registered user. The terminal can obtain the encryption index value based on user feature information and the authorization information of the registered user. The digital resource can be decrypted with the encryption index value and a digital logical circuit matching the digital logical circuit generating the authorization information.

In the above illustrated embodiment, when the terminal of the registered user receives the authorization information from the device, the registered user will need to input the user feature information that matches the registered user feature information, for the terminal to obtain the encryption index value of the registered user according to the inputted user feature information. The terminal can then use the obtained encryption index value to decrypt the encrypted digital resource using the matching digital logic circuit.

In the above illustrated embodiment, the authorization information is the value after performing the XOR operation on the user feature information F and the encryption index value Aindex1, i.e., $F \oplus Aindex1$. Assuming F=0111001, and Aindex1=1010001, the authorization value $U=F \oplus Aindex1=1101000$. If the user feature information input at the authorized terminal is also F, the XOR operation on the input user feature information F and the authorization value U1 will generate Aindex1, i.e., $F \oplus U=1010001=Aindex1$. In exemplary embodiments, the user feature information inputted at the authorized terminal may not be exactly the same as the registered user feature information. For example, user designated gestures and user biological information may change as a result of a change in sensing locations. For example, the user feature information input at the authorized terminal may be F'. Therefore, in the embodiments, a fault tolerance and a fault rectification mechanism is provided by setting an error correction code (ECC), such that the user feature information input at the authorized terminal within an applicable range is regarded as the same as the registered user feature information. For example, if the ECC is set, ECC $\oplus$ F can generate EF, i.e., EF=ECC $\oplus$ F. If the user feature information F' input at the authorized terminal falls into the applicable range, the authorized terminal can recover ECC from F' $\oplus$ EF and further recover F from ECC $\oplus$ EF. Alternatively, if the user feature information F' falls beyond the applicable range, the authorized terminal cannot recover ECC from F' $\oplus$ EF and, hence, cannot recover F.

In exemplary embodiments, a subdivision control mechanism is provided. In one exemplary embodiment, the device configures a first one of the N encryption index values with a first response vector value corresponding to the first encryption index value. The first response vector value is used to control a number of times the digital resource is used by the registered user bound with the first encryption index value. The first response vector value varies according to the number of times the digital resource is used by the registered user. When the number of times reaches a preset threshold, the first response vector value will cause the first encryption index value to expire or cause the binding of the first encryption index value and the user feature information of the registered user to expire. For example, assuming that when the first response vector value is 0, the first encryption index value will expire or the binding of the first encryption index value and the user feature information of the registered user will expire, and that the device will allow the registered user to use the digital resource for 50 times, the first response vector value can be set to be 50 initially. Each time the registered user uses the digital resource once, the first response vector value will be decreased by one.

In one exemplary embodiment, the device configures a second one of the N encryption index values with a second response vector value corresponding to the second encryption index value. The second response vector value is used to limit a use period of the digital resource by the user that is bound with the second encryption index value. The second response vector value can vary according to a change in time, and can maintain the same value when the current time is in the use period. The second response vector value may cause the second encryption index value to expire or cause the binding of the second vector value and the user feature information to expire, when the current time is not in the use period. For example, assuming that the first response vector value is 0, the first encryption index value expires or the binding of the first encryption index value and the user feature information of the registered user expires, then if the device will only allow the user to use the digital resource within the time period of T, the second response vector value can be set to be T. When the current time is within a time period of T, the second response vector value is not 0 and the second encryption index value works; and when the current time is beyond the time period of T, the second response vector value can be set to be 0 and the second encryption index value expires.

In one exemplary embodiment, the device configures a third one of the N encryption index values with a third response vector value corresponding to the third encryption index value. The third response vector value is used to limit the terminal used by the user that is bound with the third encryption index value to access the digital resource, such as limiting a type of the terminal or a specific terminal.

In one exemplary embodiment, the device configures a fourth one of the N encryption index values with a fourth response vector value corresponding to the fourth encryption index value. The fourth response vector value is used to limit a physical position for the use of the digital resource by the user that is bound with the fourth encryption index value.

The device can also configure other response vector values for the use of the digital resource. It is not limited by the present disclosure.

In exemplary embodiments, considering circulation of the digital resource, users of the digital resource may change. For example, a registered user may transfer the digital resource to another user, or when the use period expires, the registered user loses the use right. Accordingly, the device may cancel the registered user's use right to the digital resource. For example, to cancel the registered user's use right, the device can cause the encryption index value that is bound with the registered user to expire, or relieve the binding between user feature information of the registered user and the encryption index value.

For example, assuming that a first, registered user F1 has the use right of the digital resource and a second user F2 does not, if F1 transfers the digital resource to F2, the device will relieve the binding between user feature information of F1 and the encryption index value that is bound with F1. The device will obtain user feature information of F2, and bind the encryption index value and the obtained user feature information of F2 so as to generate authorization information of F2. The device will send the authorization information of F2 to F2, thereby completing authorization exchange between F1 and F2. Thereafter, F1 will no longer have the right to use the digital resource, and F2 obtains the right to use the digital resource.

In exemplary embodiments, the digital resource can be digital media, such as text, image, audio, video, or any combination thereof, computer software, e-service, protection provisions of apparatus using rights, etc.

Figure 5:
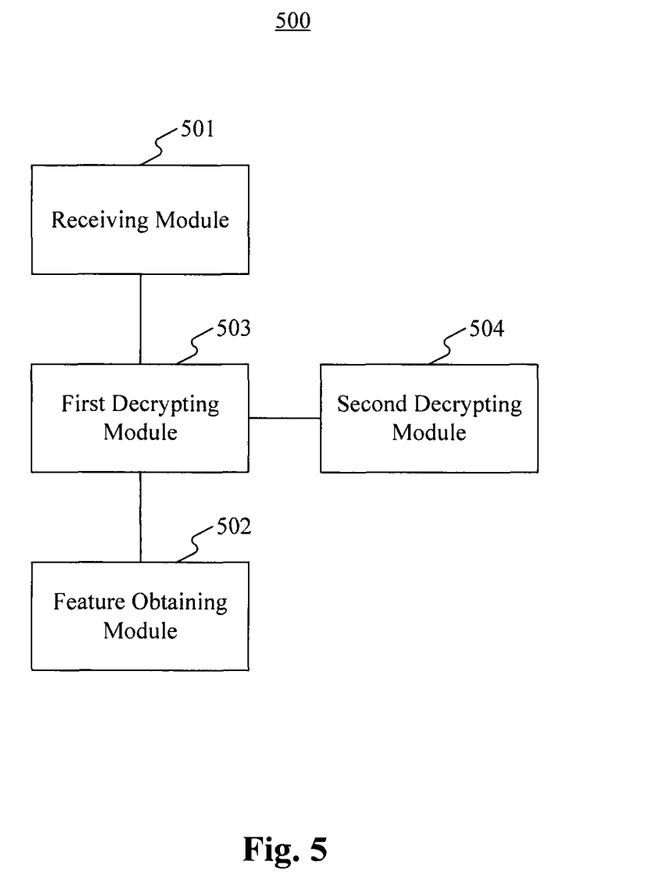
FIG. 5 is a block diagram of a digital resource using apparatus, according to an exemplary embodiment.

FIG. 5 is block diagram of a digital resource using apparatus 500, according to an exemplary embodiment. Referring to FIG. 5, the apparatus 500 includes a receiving module 501, a feature obtaining module 502, a first decrypting module 503, and a second decrypting module 504.

The receiving module 501 is configured to receive authorization information of a registered user. For example, the authorization information is generated by a digital resource protection apparatus by binding user feature information of the registered user with one of N encryption index values, as described above.

The feature obtaining module 502 is configured to obtain user feature information of the registered user. For example, the user feature information includes one or more of a terminal identification of the apparatus 500, designated gesture or touch movement information, user biological information, and characters input by the user. The terminal identification is used to identify the apparatus 500 when using the digital resource. The apparatus 500 may have a touch function so that the registered user can input a designated gesture or touch movement via the touch function. In this way, the feature obtaining module 502 can obtain designated gesture or touch movement information. The biological information can be face information, pupil information, or fingerprint information. Similar to the above description in connection with the method 200 (FIG. 2), the user feature information obtained by the feature obtaining module 502 may be different than the user feature information obtained at the registration, and a fault tolerance and rectification mechanism may be used by the feature obtaining module 502 by setting an error correction code (ECC).

The first decrypting module 503 is configured to obtain the encryption index value that is bound with the registered user by decrypting the received authorization information according to the user feature information obtained by the feature obtaining module 502.

The second decrypting module 504 is configured to decrypt an encrypted digital resource by inputting the encryption index value obtained by the obtaining module 503 and the encrypted digital resource to a digital logic circuit to perform a logical decryption, to obtain the decrypted digital resource.

In exemplary embodiments, the apparatus 500 also includes an authority exchange module (not shown) configured to bind the encryption index value and user feature information of another user obtained by the feature obtaining module 502, so as to generate authorization information of the other user, and a sending module (not shown) configured to send the authorization information of the other user to a terminal of the other user, so that the other user obtains use right to the digital resource. Furthermore, the authority exchange module can cancel the registered user's use right to the digital resource.

In exemplary embodiments, the digital resource can be digital media, such as text, image, audio, video, or any combination thereof, computer software, e-service, protection provisions of apparatus using rights, etc.

Figure 6:
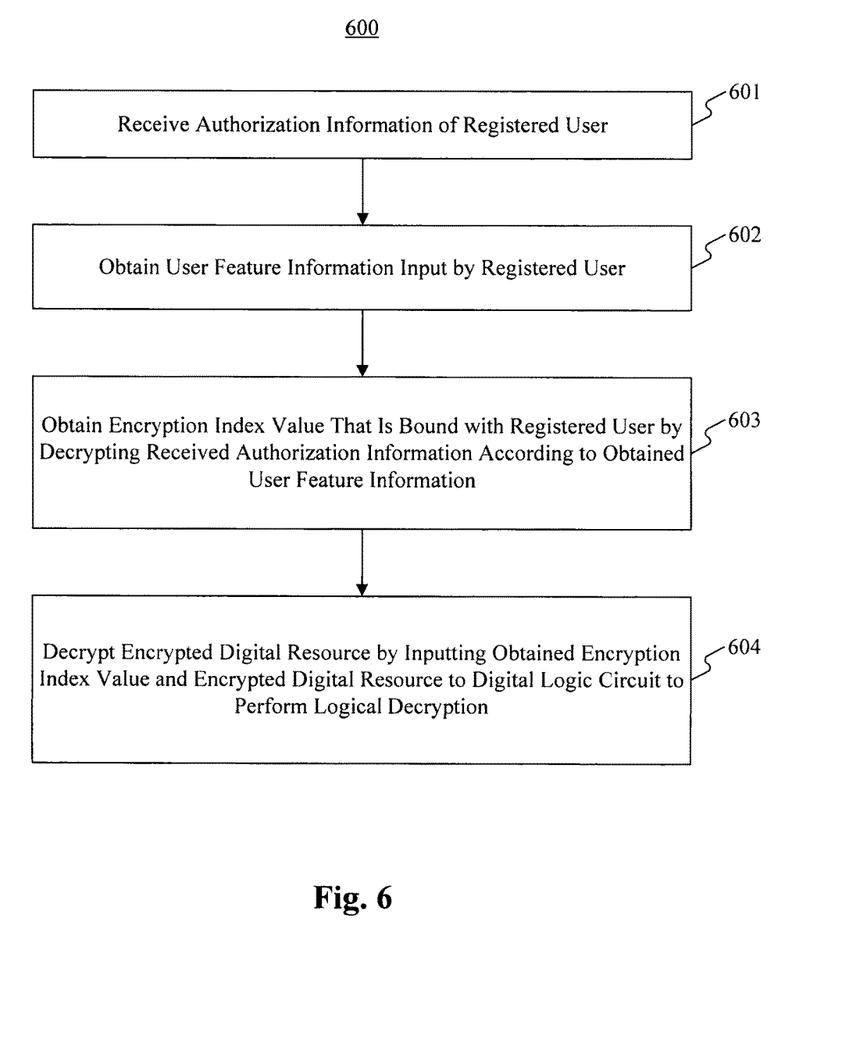
FIG. 6 is a flowchart of a digital resource using method, according to an exemplary embodiment.

FIG. 6 is flowchart of a digital resource using method 600 for use in a terminal, according to an exemplary embodiment. Referring to FIG. 6, the method 600 includes the following steps.

In step 601, the terminal receives authorization information of a registered user. For example, the authorization information is generated by a digital resource protection apparatus by binding user feature information of the registered user with one of N encryption index values, as described above.

In step 602, the terminal obtains user feature information input by the registered user. For example, the user feature information includes one or more of a terminal identification of the terminal, designated gesture or touch movement information, user biological information, and characters input by the user. The terminal identification is used to identify the terminal when using the digital resource. The terminal may have a touch function so that the registered user can input a designated gesture or touch movement via the touch function. In this way, the terminal can obtain designated gesture or touch movement information. The biological information can be face information, pupil information, fingerprint information, etc. Similar to the above description in connection with the method 200 (FIG. 2), the user feature information obtained by the terminal may be different than the user feature information obtained at the registration, and a fault tolerance and rectification mechanism may be used by the terminal by setting an error correction code (ECC).

In step 603, the terminal obtains the encryption index value that is bound with the registered user by decrypting the received authorization information according to the obtained user feature information.

In step 604, the terminal decrypts an encrypted digital resource by inputting the obtained encryption index value and the encrypted digital resource to a digital logic circuit to perform a logical decryption, to obtain the decrypted digital resource.

In exemplary embodiments, the method 600 also includes obtaining user feature information of another user, and binding the encryption index value obtained in step 603 with the user feature information of the other user so as to generate authorization information for the other user. The method 600 further includes sending the authorization information of the other user to a terminal of the other user, so that the other user obtains use right to the digital resource. Furthermore, the previously registered user can be cancelled, so that the registered user cannot use the digital resource.

In exemplary embodiments, the digital resource can be digital media, such as text, image, audio, video or any combination thereof, computer software, e-service, protection provisions of apparatus using rights, etc.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

In exemplary embodiments, there is also provided a non-transitory computer-readable medium including instructions, executable by a processor, for performing the above described methods. For example, the non-transitory computer-readable medium may be a USB flash disk, a mobile hard disk drive (HDD), a read-only memory (ROM), a random access memory (RAM), a magnetic disk, a compact disk, or other media for storing program codes.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A digital resource protection apparatus, comprising:
a preset digital logic circuit; and
a processor configured to execute instructions to:
configure N encryption index values for a digital resource to be encrypted, wherein N is an integer greater than 0;
perform a logic encryption of the digital resource through the preset digital logic circuit, by using one or more of the N encryption index values and the digital resource as input parameters of the preset digital logic circuit;
obtain user feature information of a user from a terminal of the user and determine if a value of a piece of the obtained user feature information is within a predetermined range, the user feature information including at least one of: a terminal identification, designated gesture or touch movement information, user biological feature information, or a character input by the user;

bind the obtained user feature information with a first one of the N encryption index values, by performing a logical operation on the obtained user feature information and the first one of the N encryption index values to generate authorization information of the user; and send the authorization information of the user to the terminal, wherein: the first encryption index value is determined by the terminal based on the authorization information and user feature information inputted by the user to the terminal, and the encrypted digital resource is decrypted by the terminal using a digital logical circuit matching the preset digital logic circuit.

2. The apparatus of claim 1, wherein the processor is further configured to execute the instructions to configure the first encryption index value with a response vector value, the response vector value being used to control a number of times the digital resource is used by the user bound with the first encryption index value.

3. The apparatus of claim 1, wherein the processor is further configured to execute the instructions to configure the first encryption index value with a response vector value, the response vector value being used to limit a use period of the digital resource by the user bound with the first encryption index value.

4. The apparatus of claim 1, wherein the processor is further configured to execute the instructions to configure the first encryption index value with a response vector value, the response vector value being used to limit a terminal to access the digital resource used by user bound with the first encryption index value.

5. The apparatus of claim 1, wherein the processor is further configured to execute the instructions to configure the first encryption index value with a response vector value, the response vector value being used to limit a physical position for use the digital resource by the user bound with the first encryption index value.

6. The apparatus of claim 1, wherein the processor is further configured to cancel the user's use right to the digital resource.

7. The apparatus of claim 1, wherein the processor is further configured to execute the instructions to determine N to be equal to a circulation amount of the digital resource.

8. A digital resource protection method performed by a processor, comprising:

configuring N encryption index values for a digital resource to be encrypted, wherein N is an integer greater than 0;

performing a logic encryption of the digital resource through a preset digital logic circuit coupled with the processor, by using one or more of the N encryption index values and the digital resource as input parameters of the preset digital logic circuit;

obtaining user feature information of a user from a terminal of the user;

binding the obtained user feature information with a first one of the N encryption index values, by performing a logical operation on the obtained user feature information and the first one of the N encryption index values to generate authorization information of the user; and sending the authorization information of the user to the terminal, wherein: the first encryption index value is determined by the terminal based on the authorization information and user feature information inputted by the user to the terminal, and the encrypted digital resource is decrypted by the terminal using a digital logical circuit matching the preset digital logic circuit;

wherein the obtaining comprises obtaining at least one of a terminal identification, designated gesture or touch movement information, user biological feature information, or a character input by the user, and the method further comprises determining if a value of a piece of the obtained user feature information is within a predetermined range.

9. The method of claim 8, further comprising:

configuring the first encryption index value with a response vector value, the response vector value being used to control a number of times the digital resource is used by the user bound with the first encryption index value.

10. The method of claim 8, further comprising:

configuring the first encryption index value with a response vector value, the response vector value being used to limit a use period of the digital resource by the user bound with the first encryption index value.

11. The method of claim 8, further comprising:

configuring the first encryption index value with a response vector value, the response vector value being used to limit a terminal to access the digital resource used by the user bound with the first encryption index value.

12. The method of claim 8, further comprising:

configuring the first encryption index value with a response vector value, the response vector value being used to limit a physical position for use the digital resource by the user bound with the first encryption index value.

13. The method of claim 8, further comprising:

cancelling the user's use right to the digital resource.

14. The method of claim 8, further comprising:

determining N to be equal to a circulation amount of the digital resource.

* * * * *